UNITED STATES PATENT OFFICE.

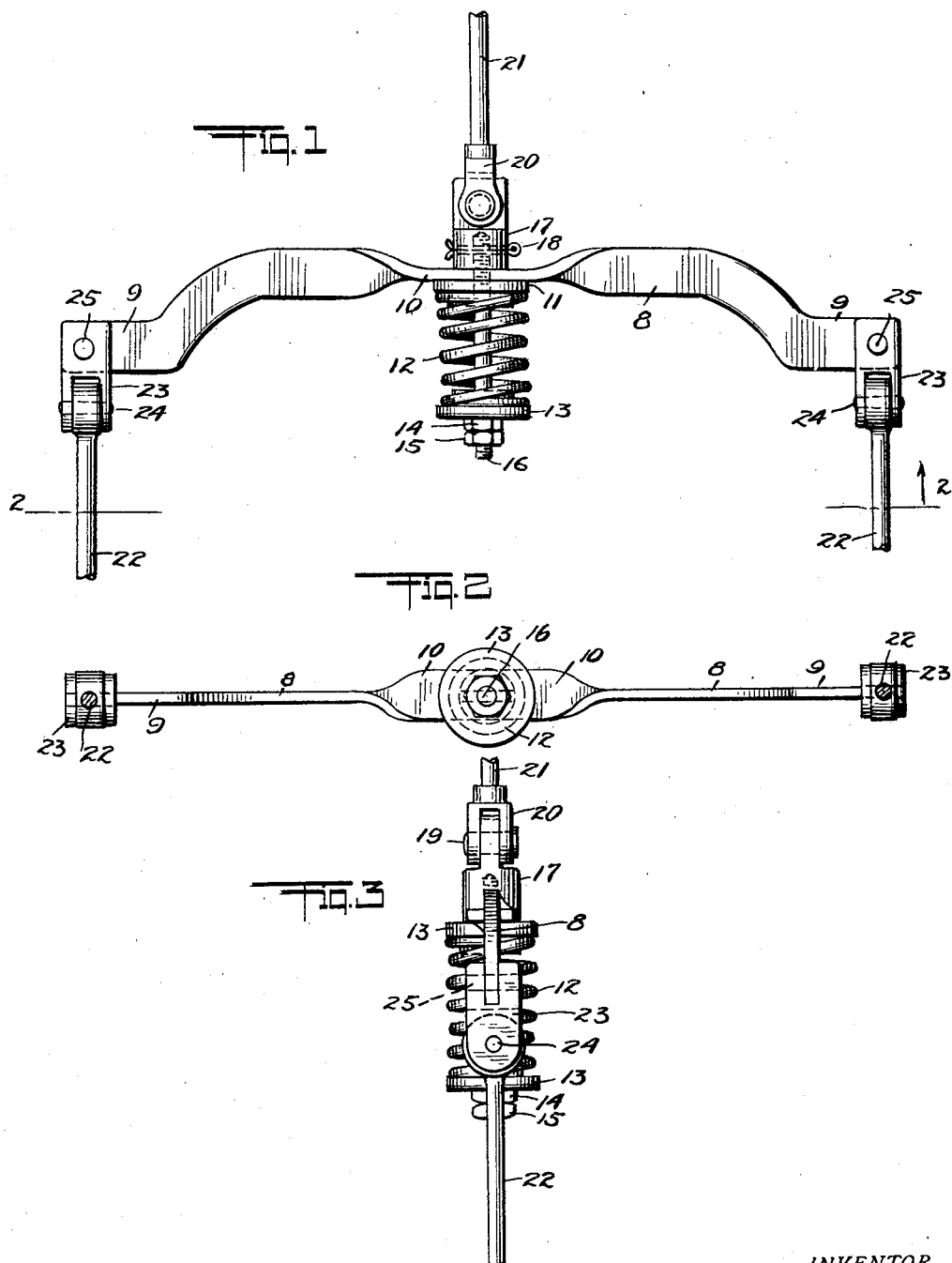

SAMUEL D. HELLER AND LINTON HERRON, OF PONTIAC, MICHIGAN.

AUTOMOBILE BRAKE MECHANISM.

1,400,286.  Specification of Letters Patent.  Patented Dec. 13, 1921.

Application filed November 15, 1920. Serial No. 424,261.

*To all whom it may concern:*

Be it known that we, SAMUEL D. HELLER and LINTON HERRON, citizens of the United States, and residents of Pontiac, county of Oakland, State of Michigan, have invented certain new and useful Improvements in Automobile Brake Mechanism, of which the following is a full, clear, and exact description.

Among the principal objects which the present invention has in view are: to equalize the service strain imparted to brakes operating in paired relation; to control the service pressure which may be imposed upon the brakes; and to simplify the construction and increase the efficiency thereof.

Drawings.

Figure 1 is a top plan view of an equalizing bar constructed and arranged in accordance with the present invention; having associated therewith fragments of the drawbars of the various functioning parts;

Fig. 2 is a vertical section thereof, the section being taken as on the line 2—2 in Fig. 1;

Fig. 3 is a side view of the construction shown in Fig. 1.

Description.

As shown in the drawings the equalizing bar 8 is constructed from flat bar material, bent near the extremities to form offset extensions 9 to the rear of the center plate 10. The plate 10 is formed by twisting the bar 8 and functions to seat the spring cup 11 in which the spring 12 rests. The spring 12 also engages the spring cup 13 which is adjustably retained in working position by the nut 14 and lock nut 15 associated therewith at the end of the draw bolt 16.

The bolt 16 passes through an appropriate perforation in the plate 10, and is anchored in a connecting block 17 by means of a screw-threaded section and a cotter pin 18 which prevents the bolt turning in the block 17.

The block 17 is pivotally connected by the pin 19 with the yoke 20 at the end of the draw bar 21 which in service is connected with the foot or emergency lever of an automobile or other vehicle.

The pull rods 22 are pivotally connected with the equalizing bar 8 and the extensions 9 thereof by the double extension yokes 23 and by means of the pins 24 and 25 uniting the said rods and yokes and the said extensions and yokes.

When provided with a construction such as shown in the drawings, and as above described, the operation of the brake mechanism of a vehicle is as follows: A pull is exerted through the draw bar 21 and the draw bolt 16 to the spring 12, which is compressed according to the strain imparted thereon. The strain so imparted is transferred to the equalizing bar 8 and to the plate 10 thereof. By interposing the spring 12 between the draw bar 21 and the equalizing bar 8, the construction is insured against too sudden and too severe an application of the brakes or the mechanism thereof at the ends of the pull rods 22. It is obvious that if the resistance of the brake mechanism attached to one wheel is greater than that of the other, the bar 8 will rock on the spring 12 to compensate or equalize the strains on the two brake mechanisms. Flexibility is imparted to the mechanism by the yokes 20 and 23 to prevent the binding of any of the joints.

Claims.

1. An automobile brake mechanism comprising an equalizing bar having a vertically spread section and laterally extended horizontally spread sections; a plurality of pull rods for operation upon brake devices; a plurality of uniting members operatively connecting the members of said equalizing bar and said pull rods; a draw bar operatively disposed in line with the center of said equalizing bar for operative connection therewith; a draw bolt operatively connected with said draw bar by means of a vertically disposed pivot member, said draw bolt extending to the rear of said equalizing bar; and a buffer spring operatively disposed between the middle section of said equalizing bar and the end of said bolt for normally maintaining said bolt extended to the rear of said equalizing bar to relieve excess pressure on said equalizing bar during the operation of applying the brakes.

2. An automobile brake mechanism comprising an equalizing bar having a vertically disposed relatively thin central bearing plate and lateral extensions emanating therefrom of approximately the same thickness, said extensions being formed by twisting said bar to place the bodies of said extensions in a plane perpendicular to a plane coincident with said plate, the ends of said bar being rearwardly disposed with relation to said plate; a plurality of universally pivoted yokes operatively mounted at extremities of said lateral extensions for connecting the same with pull rods of brake mechanisms disposed in paired relation; and means for connecting said plate with the draw bar of a brake mechanism for cushioning the strain of said mechanism on said plate.

3. An automobile brake mechanism comprising an equalizing bar having a vertically disposed relatively thin central bearing plate and lateral extensions emanating therefrom of approximately the same thickness, said extensions being formed by twisting said bar to place the bodies of said extensions in a plane perpendicular to a plane coincident with said plate, the ends of said bar being rearwardly disposed with relation to said plate; a plurality of universally pivoted yokes operatively mounted at extremities of said lateral extensions for connecting the same with pull rods of brake mechanisms disposed in paired relation; means for connecting said plate with the draw bar of a brake mechanism for cushioning the strain of said mechanism on said plate, said means embodying a draw bolt slidably connected with said plate, and a cushion spring operatively engaging and interposed between the end of said bolt and said plate; and a connecting block for said bolt and the draw bar of a brake mechanism, said block being adjustable on said bolt for extending and diminishing the distance between the end of said bolt and said plate for increasing and diminishing the tension of said spring.

4. An automobile brake mechanism comprising an equalizing bar having a vertically disposed relatively thin central bearing plate and lateral extensions emanating therefrom of approximately the same thickness, said extensions being formed by twisting said bar to place the bodies of said extensions in a plane perpendicular to a plane coincident with said plate, the ends of said bar being rearwardly disposed with relation to said plate; a plurality of universally pivoted yokes operatively mounted at extremities of said lateral extensions for connecting the same with pull rods of brake mechanisms disposed in paired relation; means for connecting said plate with the draw bar of a brake mechanism for cushioning the strain of said mechanism on said plate, said means embodying a screw-threaded end of said bolt; and a connecting block having a tapped socket for receiving the end of said bolt to permit of adjustment of said bolt with reference to said block and said plate for varying the normal tension of said spring.

5. An automobile brake mechanism comprising an equalizing bar having a vertically disposed relatively thin central bearing plate and lateral extensions emanating therefrom of approximately the same thickness, said extensions being formed by twisting said bar to place the bodies of said extensions in a plane perpendicular to a plane coincident with said plate, the ends of said bar being rearwardly disposed with relation to said plate; a plurality of universally pivoted yokes operatively mounted at extremities of said lateral extensions for connecting the same with pull rods of brake mechanisms disposed in paired relation; means for connecting said plate with the draw bar of a brake mechanism for cushioning the strain of said mechanism on said plate, said means embodying a screw-threaded end of said bolt; a connecting block having a tapped socket for receiving the end of said bolt to permit of adjustment of said bolt with reference to said block and said plate for varying the normal tension of said spring; and a block pin extending through said bolt and block for maintaining the operative relation of said bolt and block.

6. In an automobile brake mechanism embodying a draw bar and a plurality of pull rods, an equalizing bar having a central vertically extended plate; and extensions offset therefrom disposed in a plane perpendicular to the plane of said plate, the extremities of said bar being back-set from said plate for equalizing the strain and steadying the rocking action of said equalizing bar.

7. In an automobile brake mechanism embodying a draw bar and a plurality of pull rods, an equalizing bar having a central vertically extended plate, and extensions offset therefrom disposed in a plane perpendicular to the plane of said plate, the extremities of said bar being back-set from said plate for equalizing the strain and steadying the rocking action of said equalizing bar; a draw bolt slidably extended through said plate at the middle thereof; a connection block removably mounted to said draw bolt; a buffer spring; a plurality of cups forming seats for the ends thereof; and screw-threaded means mounted on said draw bolt for compressing said spring against said plate.

SAMUEL D. HELLER.
LINTON HERRON.